United States Patent
Dahake et al.

(10) Patent No.: US 11,525,378 B2
(45) Date of Patent: Dec. 13, 2022

(54) FILTER ARRANGEMENT

(71) Applicant: Mahle International GmbH, Stuttgart (DE)

(72) Inventors: Bhushan Dahake, Pune (IN); Sabine Dreizler, Stuttgart (DE); Christian Heneka, Karlsruhe (DE); Bernd Kraemer, Schwieberdingen (DE); Predrag Panic, Kirchberg an der Murr (DE); Lucas Weithoff, Stuttgart (DE)

(73) Assignee: Mahle International GmbH

( * ) Notice: Subject to any disclaimer, the term of this patent is extended or adjusted under 35 U.S.C. 154(b) by 115 days.

(21) Appl. No.: 17/178,235

(22) Filed: Feb. 17, 2021

(65) Prior Publication Data

US 2021/0254523 A1   Aug. 19, 2021

(30) Foreign Application Priority Data

Feb. 18, 2020   (EP) .................................... 20158020

(51) Int. Cl.
  *F01N 3/021*   (2006.01)
(52) U.S. Cl.
  CPC .......... *F01N 3/0211* (2013.01); *F01N 3/0217* (2013.01); *B01D 2265/028* (2013.01);
  (Continued)
(58) Field of Classification Search
  CPC .. F01N 3/0211; F01N 3/0217; F01N 2330/12; F01N 2450/18; B01D 2265/028; B01D 2271/02
  (Continued)

(56) References Cited

U.S. PATENT DOCUMENTS 4,443,237 A * 4/1984 Ulvestad ............ B01D 46/2411
                                                                 55/498
6,833,023 B1   12/2004 Vandenberghe et al.
                        (Continued)

FOREIGN PATENT DOCUMENTS

EP    1936175 A1   6/2008
EP    3181851 A1   6/2017
              (Continued)

OTHER PUBLICATIONS

Notice of Reasons for Refusal dated Jul. 7, 2022 for Japanese Patent Application No. 2021-021468.
English abstract for EP-3181851.

*Primary Examiner* — Jorge L Leon, Jr.
(74) *Attorney, Agent, or Firm* — Fishman Stewart PLLC (57) ABSTRACT

A filter arrangement may include a filter element and a gasket element. The gasket element may include a substantially circular flow-through opening and a locking collar. The locking collar may be arranged along a circumference of the flow-through opening with respect to a circumferential direction. The locking collar may form a hollow cylindrical installation space. The filter element may include a filter element body and a substantially hollow-cylindrical counter locking collar. The counter locking collar may include an open axial side and a covered axial side which may be spaced apart from each other with respect to an axial axis. The covered axial side of the counter locking collar may be covered by said filter element body. The counter locking collar may be at least partially inserted into the hollow cylindrical installation space of the locking collar.

17 Claims, 3 Drawing Sheets

(52) U.S. Cl.
CPC ...... *B01D 2271/02* (2013.01); *F01N 2330/12* (2013.01); *F01N 2450/18* (2013.01)

(58) Field of Classification Search
USPC .......................................................... 60/311
See application file for complete search history.

(56) References Cited

U.S. PATENT DOCUMENTS

| | | | |
|---|---|---|---|
| 8,409,311 | B2 | 4/2013 | Jessberger et al. |
| 2005/0081497 | A1* | 4/2005 | Connor .............. B01D 46/0005 55/493 |
| 2005/0235620 | A1* | 10/2005 | Connor .................. B01D 46/88 55/498 |
| 2008/0302091 | A1 | 12/2008 | Nardi |
| 2014/0008282 | A1 | 1/2014 | Okai |
| 2018/0369620 | A1 | 12/2018 | Klimpel |
| 2019/0049110 | A1 | 2/2019 | Kowald |

FOREIGN PATENT DOCUMENTS

| | | |
|---|---|---|
| JP | 2004132317 A | 4/2004 |
| JP | 2011202536 A | 10/2011 |
| JP | 2012031794 A | 2/2012 |
| JP | 2015178887 A | 10/2015 |
| WO | 2011151920 A1 | 12/2011 |
| WO | WO-2017/108614 A1 | 6/2017 |

\* cited by examiner

FILTER ARRANGEMENT

CROSS-REFERENCE TO RELATED APPLICATION

This application claims priority to European Patent Application No. EP 20158020.6, filed on Feb. 18, 2020, the contents of which are hereby incorporated by reference in their entirety.

TECHNICAL FIELD

The present invention relates to a filter arrangement. Moreover, the invention relates to filter element as well as to gasket element for such a filter arrangement. Additionally, the invention relates to an exhaust system for an internal combustion engine comprising such a filter arrangement.

Such a filter arrangements are used in exhaust systems for internal combustion engines comprising an exhaust gas recirculation circuit. In such an exhaust gas recirculation circuit, at least a part of the exhaust gas stream is directed to a turbocharger compressor. Since the exhaust gas stream may comprise solid particles such as residual dirt, the exhaust systems comprises a filter arrangement with a particulate filter protecting the turbocharger compressor from solid particles in the exhaust gas.

Such filter arrangements comprise a gasket element and a filter element, the filter element being arranged to the gasket element and the gasket element being clamped between two flanges of two fluid guiding components.

WO 2017/108614 A1 describes a particulate filter comprising a filter element and, assembled thereto, a structural element removably attached to a filter support defined in a connection flange or a gas reservoir. Additionally, a continuous peripheral seal is coupled to the contour of the peripheral frame, the purpose of which is to prevent the exit of gas once the filter has been mounted.

A disadvantage of such a particulate filter is that several separate components are required and that the application of the continuous peripheral seal is time-consuming and cost-intensive.

A further disadvantage is that a replacement filter element can only be inserted transversely to the flow direction, which requires additional installation space.

Compared to WO 2017/108614 A1, EP 1 936 175 A1 describes a filter arrangement having less components. The filter comprises a metallic mesh arranged to close a recirculation pipe. According to one embodiment, the metallic mesh of the filter has a flat edge which is enclosed between two halves of a seal element which are connected to each other. Thus, no additional continuous peripheral seal is required.

A further reduction in the number of components can be achieved by using a one piece and/or single-piece gasket element. This requires a joining of the gasket element and the filter element by a hemming process or welding process. Since the joining the gasket element and the filter element in hemming process or welding process is difficult, the number of required production steps increases resulting in higher manufacturing costs. Additionally, deviations within tolerance individual parts may lead to gaps which may complicate the welding process. Moreover, there is a risk of producing leakages after a welding process if components are not properly aligned and/or assembled.

SUMMARY

The present invention is based on the task of specifying an improved or alternative embodiment of a filter arrangement, in particular to specify filter arrangement which has a minimum number of components and which can be manufactured simply and inexpensively.

This problem is solved according to the invention by the subject matter of the independent claim(s). Advantageous embodiments are the subject matter of the dependent claim(s).

The present invention is based on the general concept that the filter element and the gasket element are connected to each other by a form-fit connection and/or snap-fit connection.

The filter arrangement according to invention comprises filter element and a gasket element. The filter element may form a particulate filter for filtering out solid particles from an exhaust gas stream. The filter element may be formed separate with respect to the gasket element. The filter element may be formed as single-piece element and/or one-piece element. The gasket element may be formed as single-piece element and/or one-piece element.

The gasket element comprises a substantially circular flow-through opening, in particular a circular flow-through opening, and a locking collar, wherein the locking collar is arranged along the circumference of the circular flow-through opening with respect to a circumferential direction. The circular flow-through opening may be enclosed by the gasket element, in particular by the locking collar and/or by a gasket main body. An exhaust gas stream may flow though the flow-through opening, while the gasket element, in particular the gasket main body, may provide a fluid tight sealing against an external environment. The circular flow-through opening may be at least partially enclosed and/or at least partially formed by the locking collar. The locking collar may be enclosed by the gasket main body. The locking collar may be arranged between the circular flow-through opening and the gasket main body. The locking collar may be arranged between the circular flow-through opening and the gasket main body with respect to a radial axis. The gasket main body may comprise at least one fixing hole and/or at least one fixing clip for fixing the gasket element to at least one flange and/or between two flanges.

The locking collar forms a hollow cylindrical installation space. The hollow cylindrical installation space may form a substantially ring-shaped, in particular ring-shaped, receiving area and/or receiving section for receiving at least a part of the filter element.

The filter element comprises a filter element body and a substantially hollow-cylindrical counter locking collar, in particular a hollow-cylindrical counter locking collar. The counter locking collar comprises an open axial side and a covered axial side which are spaced apart from each other with respect to an axial axis. The open axial side of the counter locking collar may enclose a substantially circular opening, in particular a circular opening. The covered axial side of the counter locking collar is covered by said filter element body. The covered axial side of the counter locking collar may be enclosed by the filter element body.

The filter element body may have a hollow semi-spherical shape. The filter element body may have a hollow cylindrical shape, wherein an axial side of the filter element body, which is spaced apart from the counter locking collar, is closed. The filter element body may have a hollow conical shape. The filter element body may be flat and/or may have a flat shape.

The filter element, in particular the counter locking collar and/or the filter element body, may be permeable to the exhaust gas stream, but may be impermeable to the solid particles contained in the exhaust gas stream.

The filter element, in particular the counter locking collar and/or the filter element body, may be formed from metallic mesh. A metallic mesh from metallic material may form meshes with regular openings. The openings are typically smaller than the size of the particles which have to be filtered out from the exhaust gas stream.

The gasket element, in particular the locking collar and/or the gasket main body, may be fluid impermeable, in particular gas impermeable and/or liquid impermeable.

The gasket element, in particular the locking collar and/or the gasket main body, may be formed from solid metallic material.

The counter locking collar is at least partially inserted into the hollow cylindrical installation space of the locking collar. The counter locking collar and the locking collar each may form a part of a form-fit connection and/or snap-fit connection.

The counter locking collar may be inserted into the hollow cylindrical installation space of the locking collar along a direction which is substantially parallel to the axial axis, in particular which is parallel to the axial axis. The axial axis may be substantially parallel, in particular parallel, to a flow direction of an exhaust gas stream.

The radial axis may be oriented transversely and/or perpendicularly to the axial axis. The circumferential direction may be arranged in a plane which may be oriented transversely and/or perpendicularly to the axial axis and/or which may be oriented parallel to the radial axis.

The filter element may completely enclose and/or completely close the flow-through opening in such a way that an exhaust gas stream flowing though the flow-through opening has to flow through the filter element.

Such a form-fit connection and/or snap-fit connection provides a simple and cost saving way of joining the filter element and the gasket element, while the number of required separate parts is minimized, in particular only two separate parts are required. Since no welding process or hemming process is required, tolerance requirements for the separate components may be reduced. Additionally, filter arrangement, in particular the filter, element can be replaced easily during maintenance.

In an advantageous embodiment of the solution according to the invention, the locking collar and the counter locking collar form a form-fit connection and/or snap-fit connection for fixing the filter element with the gasket element.

The form-fit connection may be a releasable connection or an unreleasable connection. The snap-fit connection may be a releasable connection or an unreleasable connection. In an unreleasable connection, the filter element and the gasket element cannot be separated from each other nondestructively. In a releasable connection, the filter element and the gasket element can be separated from each other nondestructively.

The locking collar, in particular sections and/or parts of the locking collar, may be elastically deformed while the counter locking collar is inserted into the hollow cylindrical installation space of the locking collar. As soon as the counter locking collar is in a final installation position, the locking collar, in particular sections and/or parts of the locking collar, may snap back in its initial position in which an elastic deformation vanishes. The initial position of locking collar with inserted counter locking collar may form a form-fit connection between the locking collar and the counter locking collar.

In an advantageous embodiment of the solution according to the invention, the locking collar forms a hollow cylindrical locking section and a hollow cylindrical holding section, wherein the hollow cylindrical installation space is formed by the hollow cylindrical locking section and the hollow cylindrical holding section which are at least partially spaced apart from each other with respect to a radial axis.

The locking section may be a hollow-circular cylindrical locking section. The holding section may be a hollow-circular cylindrical holding section. The locking section and/or the holding section may be formed continuously circumferentially with respect to the circumferential direction. The locking section and/or the holding section may be formed along one or several sections with respect to the circumferential direction.

In an advantageous embodiment of the solution according to the invention, the hollow cylindrical locking section forms several locking elements and that the hollow cylindrical holding section forms serval holding elements, wherein the locking elements are spaced apart from each other with respect to the circumferential direction, wherein the locking elements are spaced apart from each other with respect to the circumferential direction.

The locking elements may form clip elements which prevent the filter element and the gasket element from being detached and/or loosened from each other.

The holding elements may form clip elements which prevent the filter element being pushed through the flow-through opening of the gasket element. Additionally, the holding elements may provide a force, in particular a restoring force and/or a spring force, which pushes the filter element, in particular the counter locking collar, against the locking elements in order to avoid a loose fit between the filter element and the gasket element. The holding elements may provide a force, in particular a restoring force and/or a spring force, along the radial axis, in particular a radially outward acting force with respect to the radial axis.

In an advantageous embodiment of the solution according to the invention, the locking elements are substantially spaced equidistantly from each other with respect to the circumferential direction, and/or the holding elements are substantially spaced equidistantly from each other with respect to the circumferential direction. Due to this, the filter element may be fixed to a gasket element in a symmetrical and uniform manner. This enables an even distribution of the mechanical load and therefore, for example, a material-reduced and/or material-optimized construction.

In an advantageous embodiment of the solution according to the invention, one locking element each is arranged between two adjacent holding elements with respect to the circumferential direction, and/or the number of locking elements equals the number of holding elements. Due to this, the locking collar and the counter locking collar may form a mechanically particularly resistant connection.

In an advantageous embodiment of the solution according to the invention, each locking element has a lever section and a hook section, wherein the lever section substantially extends along the axial axis, wherein the lever section is followed by the hook section, wherein the hook section substantially extends along the radial axis towards a center of the circular flow-through opening.

The lever section may have a first end and a second end. The first end of the lever section may be connected to the gasket main body. The second end may be a free end which is spaced apart from the gasket main body. The second end may be followed by the hook section.

The lever section may be elastically deformed while the counter locking collar is inserted into the hollow cylindrical installation space of the locking collar. Due to this, the hook section may be pushed radially outside in respect to the radial axis. As soon as the counter locking collar is in a final installation position, the lever section may snap back in its initial position in which an elastic deformation vanishes. The initial position of lever section with inserted counter locking collar may form a form-fit connection between the counter locking collar, the lever section and the hook section. The hook section may prevent the counter locking collar from being detached along the axial axis. The hook section may prevent the counter locking collar from being detached along the axial axis in a form-fitting manner.

Thus, the locking elements may form clip elements which prevent the filter element and the gasket element from being detached and/or loosened from each other.

In an advantageous embodiment of the solution according to the invention, each holding element has a support section and a spring section, wherein the support section substantially extends along a radial axis towards a center of the circular flow-through opening, wherein the support section is followed by the spring section, wherein the spring section substantially extends along the axial axis.

The support section may have a first end and a second end. The first end of the support section may be connected to the gasket main body. The second end may be a free end which is spaced apart from the gasket main body. The second end may be followed by the spring section.

The spring section may be elastically deformed while the counter locking collar is inserted into the hollow cylindrical installation space of the locking collar. Due to this, the spring section may be pushed radially inside in respect to the radial axis.

As soon as the counter locking collar is in a final installation position, the spring section pushes against the filter element trying to move back in its initial position in which the elastic deformation vanishes. Thus, the spring section, in particular a contact section of the spring section which contacts an inner surface of the filter element, may provide a force which pushes the filter element radially outwards in respect to the radial axis. The spring section, in particular the contact section of the spring section, may push an outer surface of the filter element against an inner surface of a fluid guiding component if the filter arrangement is installed in such a fluid guiding component. In such a case the spring section, in particular the contact section of the spring section, may provide a gap-free contact between a part of the outer surface of the filter element and a part of the inner surface of a fluid guiding component, such that pollutant particles cannot pass between the part of the inner surface of a fluid guiding component and the part of the outer surface of the filter element. Several spring sections, in particular the contact sections of the spring sections, may provide a continuously gap-free contact of a part of the outer surface of the filter element and a part of the inner surface of a fluid guiding component in the circumferential direction.

The support section may form a section which prevents the filter element being pushed through the flow-through opening of the gasket element. Additionally, the spring section may provide a force, in particular a restoring force and/or a spring force, which pushes the filter element, in particular the counter locking collar, against the locking elements in order to avoid a loose fit between the filter element and the gasket element. The spring section may provide a force, in particular a restoring force and/or a spring force, along the radial axis, in particular a radially outward acting force with respect to the radial axis.

In an advantageous embodiment of the solution according to the invention, the lever sections and the spring sections are spaced apart from each other with respect to the radial axis, and/or the spring sections have a t-shaped contour.

In an advantageous embodiment of the solution according to the invention, the counter locking collar has greater material thickness than the filter element body. The material thickness may be the wall thickness, in particular the wall thickness considered in cross section of the filter element. Thus, the counter locking collar has an enough high mechanical resistance thickness while the reduced material thickness of the filter element body provides a reduced and/or optimized flow resistance.

In an advantageous embodiment of the solution according to the invention, the filter element has an inner surface and an outer surface, wherein the inner surface and the outer surface are connected by a forehead surface of the open axial side of the counter locking collar, wherein the locking section at least partially contacts at least a section of the outer surface, wherein the holding section at least partially contacts at least a section of the inner surface, wherein the holding section at least partially contacts at least a section of the forehead surface. The forehead surface may have a ring shape and/or circular ring shape.

The inner surface of the filter element may be the surface of the filter element which faces the flow-through opening of the gasket element with respect to the axial axis. The outer surface of the filter element may be the surface of the filter element which faces away the flow-through opening of the gasket element with respect to the axial axis.

The hooks sections may at least partially contact at least a section of the outer surface, wherein the spring sections may at least partially contact at least a section of the inner surface, wherein the support sections may at least partially contact at least a section of the forehead surface.

In an advantageous embodiment of the solution according to the invention, the filter element is a particulate filter, and/or the filter element is formed from a metallic mesh, and/or the gasket element is formed from metallic material, and/or the gasket element is a one-piece punched and bent part and/or a single-piece punched and bent part.

The gasket element may be a one-piece punched and bent part and/or a single-piece punched and bent part from metallic material and/or from metal sheet.

A one-piece punched and bent part and/or a single-piece punched and bent part may be a part which is formed by punching and bending a metal sheet. First, the metal sheet may be punched and then the punched part of the metal sheet may be bended to form the gasket element according to this invention.

Furthermore, the invention relates to a filter element for a filter arrangement according to the invention. The filter element may comprise the features described above individually or in any combination.

The filter element comprises a substantially hollow-cylindrical counter locking collar. The counter locking collar comprises an open axial side and a covered axial side which are spaced apart from each other with respect to an axial axis. The covered axial side of the counter locking collar is covered by a filter element body, wherein the counter locking collar is at least partially insertable in a hollow cylindrical installation space of a locking collar of a gasket element of the filter arrangement.

The filter element may be formed as single-piece element and/or one-piece element.

The filter element body may have a hollow semi-spherical shape. The filter element body may have a hollow cylindrical shape, wherein an axial side of the filter element body, which is spaced apart from the counter locking collar, is closed. The filter element body may have a hollow conical shape. The filter element body may be flat and/or may have a flat shape.

The filter element, in particular the counter locking collar and/or the filter element body, may be permeable to the exhaust gas stream, but may be impermeable to the solid particles contained in the exhaust gas stream.

The filter element, in particular the counter locking collar and/or the filter element body, may be formed from metallic mesh. A metallic mesh from metallic material may form meshes with regular openings. The openings are typically smaller than the size of the particles which have to be filtered out from the exhaust gas stream.

Furthermore, the invention relates to a gasket element for a filter arrangement according to the invention. The gasket element may comprise the features described above individually or in any combination.

The gasket element comprises a substantially circular flow-through opening and a locking collar, wherein the locking collar is arranged along the circumference of the circular flow-through opening with respect to a circumferential direction.

The locking collar forms a hollow cylindrical installation space, wherein a counter locking collar of a filter element of the filter arrangement is at least partially insertable in the hollow cylindrical installation space of the locking collar.

The gasket element may be formed as single-piece element and/or one-piece element.

The circular flow-through opening may be enclosed by the gasket element, in particular by the locking collar and/or by a gasket main body. An exhaust gas stream may flow though the flow-through opening, while the gasket element, in particular the gasket main body, may provide a fluid tight sealing against an external environment. The circular flow-through opening may be at least partially enclosed and/or at least partially formed by the locking collar. The locking collar may be enclosed by the gasket main body. The locking collar may be arranged between the circular flow-through opening and the gasket main body. The locking collar may be arranged between the circular flow-through opening and the gasket main body with respect to a radial axis.

The gasket element, in particular the locking collar and/or the gasket main body, may be fluid impermeable, in particular gas impermeable and/or liquid impermeable.

The gasket element, in particular the locking collar and/or the gasket main body, may be formed from solid metallic material.

The gasket element may be a one-piece punched and bent part and/or a single-piece punched and bent part from metallic material and/or from metal sheet.

A one-piece punched and bent part and/or a single-piece punched and bent part may be a part which is formed by punching and bending a metal sheet. First, the metal sheet may be punched and then the punched part of the metal sheet may be bended to form the gasket element according to this invention.

Furthermore, the invention relates to an exhaust system for an internal combustion engine. The exhaust system comprises a first fluid guiding component with a first fluid path and a first flange as well as a second fluid guiding component with a second fluid path and a second flange. The exhaust system comprises a filter arrangement according to the invention, wherein the filter arrangement, in particular the gasket element, is arranged and/or clamped between the first flange and the second flange providing a connection of the first fluid path and the second fluid path in a fluid tight manner against an external environment of the fluid guiding components. These components of the exhaust system may be arranged in an exhaust gas recirculation circuit. These components of the exhaust system may be arranged in an exhaust gas recirculation circuit upstream an exhaust gas recirculation valve and/or upstream turbocharger compressor.

The first fluid guiding component, in particular the first flange, may form a ring-shaped installation space and/or a ring groove for the counter locking collar of the filter element. At least a part of the filter element, in particular the counter locking collar of the filter element, may be inserted circumferentially, in particular continuous continuously inserted, in the ring-shaped installation space and/or a ring groove.

The first fluid guiding component may comprise an inner surface and/or tube inside wall. The spring sections of the filter arrangement, in particular a contact sections of the spring sections which contacts an inner surface of the filter element, may provide a force which pushes the filter element radially outwards in respect to the radial axis. The spring sections, in particular the contact sections of the spring section, may push an outer surface of the filter element against an inner surface of a fluid guiding component if the filter arrangement is installed in such a fluid guiding component. In such a case the spring section, in particular the contact section of the spring section, may provide a gap-free contact between a part of the outer surface of the filter element and a part of the inner surface of a fluid guiding component, such that pollutant particles cannot pass between the part of the inner surface of a fluid guiding component and the part of the outer surface of the filter element. Several spring sections, in particular the contact sections of the spring sections, may provide a continuously gap-free contact of a part of the outer surface of the filter element and a part of the inner surface of a fluid guiding component in the circumferential direction.

Further important features and advantages of the invention result from the de-pendent claims, from the drawings and from the associated description of the figures with reference to the drawings.

It is apparent that the above-mentioned features and the features to be explained hereafter are usable not only in the respective specified combination, but also in different combinations or alone without leaving the scope of the present invention.

Preferred exemplary embodiments of the invention are illustrated in the drawings and are explained in more detail in the description below, wherein the same reference signs refer to identical or similar or functionally identical components.

BRIEF DESCRIPTION OF THE DRAWINGS

In the drawings, in each case schematically.

DETAILED DESCRIPTION

Figure 1:
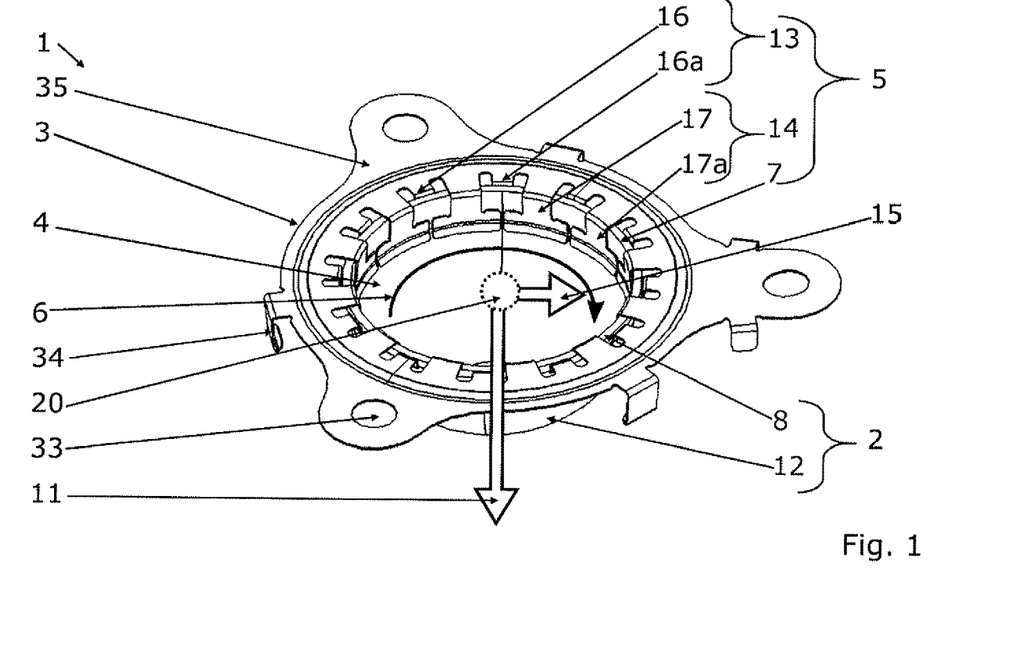
FIG. 1 shows a perspective view of a filter arrangement according to the invention.
Figure 2:
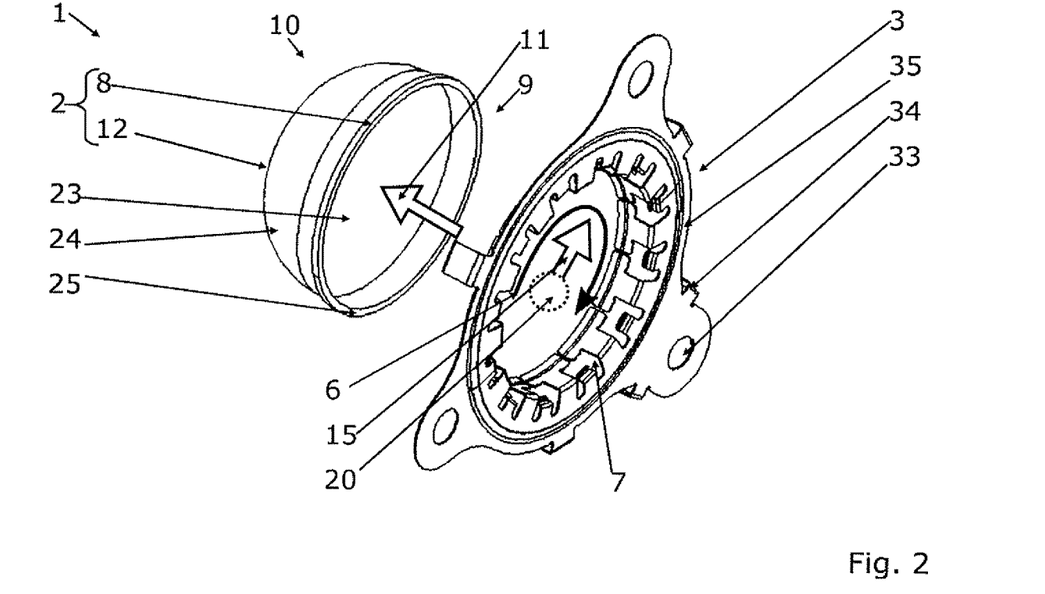
FIG. 2 shows a perspective view of a filter arrangement according to the invention, wherein the filter element and the gasket are unassembled.

FIG. 1 shows a perspective view of a filter arrangement 1 according to the invention with a filter element 2 and a gasket element 3, wherein the filter element 2 is fixed to the gasket element 3 by a form-fit connection and/or snap-fit connection. FIG. 2 show a perspective of the filter arrangement 1 of FIG. 1, wherein the filter element 2 and the gasket 3 are unassembled.

The gasket element 3 comprises a substantially circular flow-through opening 4 and a locking collar 5, wherein the locking collar 5 is arranged along the circumference of the circular flow-through opening 4 with respect to a circumferential direction 6. The circular flow-through opening 4 is be enclosed by the gasket element, in particular by the locking collar 5 and/or by a gasket main body 35. The locking collar 5 is completely enclosed by the gasket main body 35 with respect to the circumferential direction 6. The locking collar 5 is arranged between the circular flow-through opening 4 and the gasket main body 35 with respect to a radial axis 15.

Figure 5:
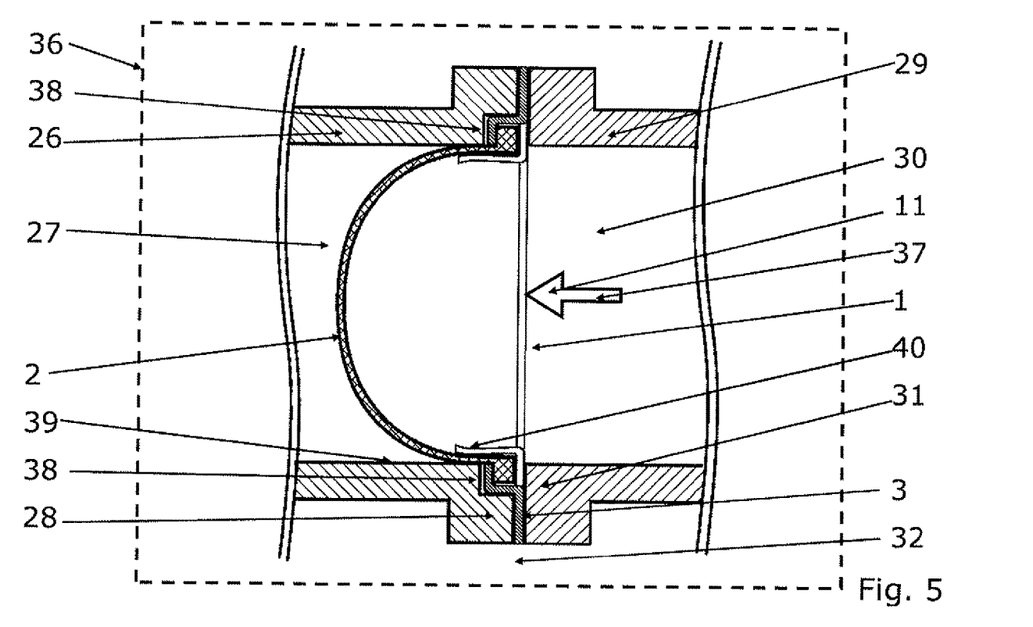
FIG. 5 shows an exhaust system according to the invention.

The gasket main body 35 comprises at least several fixing holes 33 and several fixing clips34. These fixing holes 33 and fixing clips34 may be used to fix the gasket element 3 to at least one flange 28 or 31 and/or to fix the gasket element 3 between two flanges 28, 31. The flanges are schematically shown in FIG. 5. In FIG. 1 and FIG. 2, the gasket main body 35 comprises three fixing holes 33 which a spaced apart from each other with respect to the circumferential direction 6 by 120°.

The locking collar 5 forms a hollow cylindrical locking section 13 and a hollow cylindrical holding section 14, wherein a hollow cylindrical installation space 7 of the locking collar 5 is formed by the hollow cylindrical locking section 13 and the hollow cylindrical holding section 14 which are at least partially spaced apart from each other with respect to the radial axis 15. Thus, the locking collar 5 forms a hollow cylindrical installation space 7. The hollow cylindrical installation space 7 may be defined as the material-free space between the hollow cylindrical locking section 13 and the hollow cylindrical holding section 14.

The hollow cylindrical locking section 13 forms several locking elements 16, 16a and the hollow cylindrical holding section 14 forms serval holding elements 17, 17a. For the sake of simplicity, only two elements were provided with reference signs, wherein the skilled person in the art is able to recognize the symmetrical structure. The locking elements 16 are substantially spaced equidistantly from each other with respect to the circumferential direction 6 and the holding elements 17 are substantially spaced equidistantly from each other with respect to the circumferential direction 6. One locking element 16 each is arranged between two adjacent holding elements 17 with respect to the circumferential direction 6.

The filter element 2 comprises a substantially hollow-cylindrical counter locking collar 8. The counter locking collar 8 comprises an open axial side 9 and a covered axial side 10 which are spaced apart from each other with respect to an axial axis 11. The open axial side 9 and a covered axial side 10 are better recognizable in FIG. 2. The covered axial side 10 of the counter locking collar 8 is covered and/or enclosed by a filter element body 12. The filter element body 12 has a hollow semi-spherical shape.

The radial axis 15 is oriented transversely and/or perpendicularly to the axial axis 11. The circumferential direction 6 is arranged in a plane which is oriented transversely and/or perpendicularly to the axial axis 11 and which is oriented parallel to the radial axis 15.

As shown in FIG. 1, the counter locking collar 8 is at least partially inserted in the hollow cylindrical installation space 7 of the locking collar 5. The counter locking collar 8 and the locking collar 5 each form a part of a form-fit connection and/or snap-fit connection.

As shown in FIG. 2, the counter locking collar 8 may be inserted into the hollow cylindrical installation space 7 of the locking collar 5 along a direction which is substantially parallel to the axial axis 11. The axial axis 11 may be substantially parallel to a flow direction3 7 of an exhaust gas stream as depicted in FIG. 5.

Figure 3:
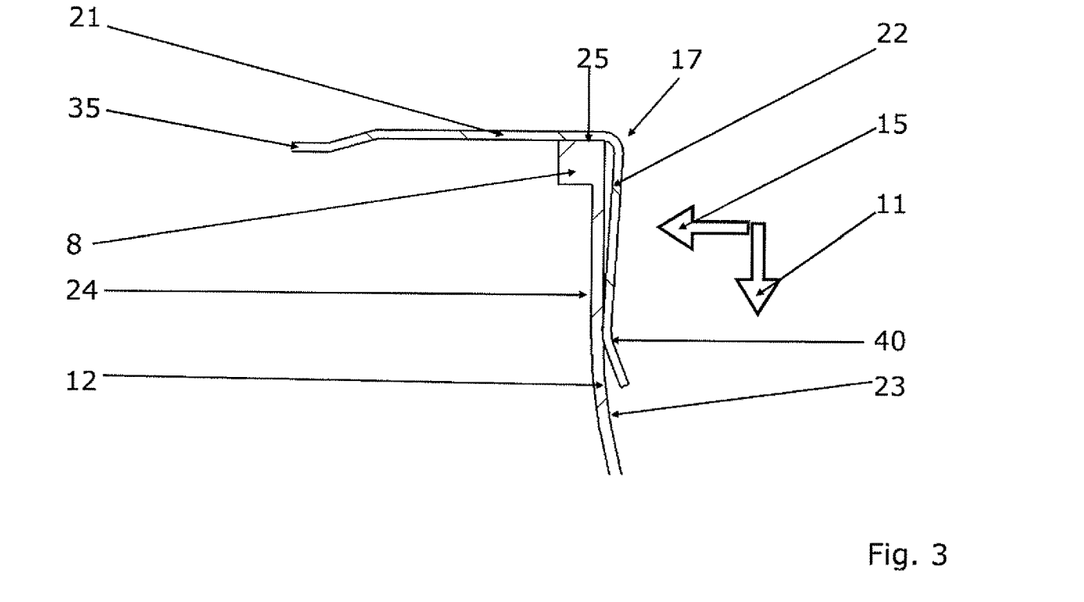
FIG. 3 shows a first sectional view of the filter arrangement according to the invention.
Figure 4:
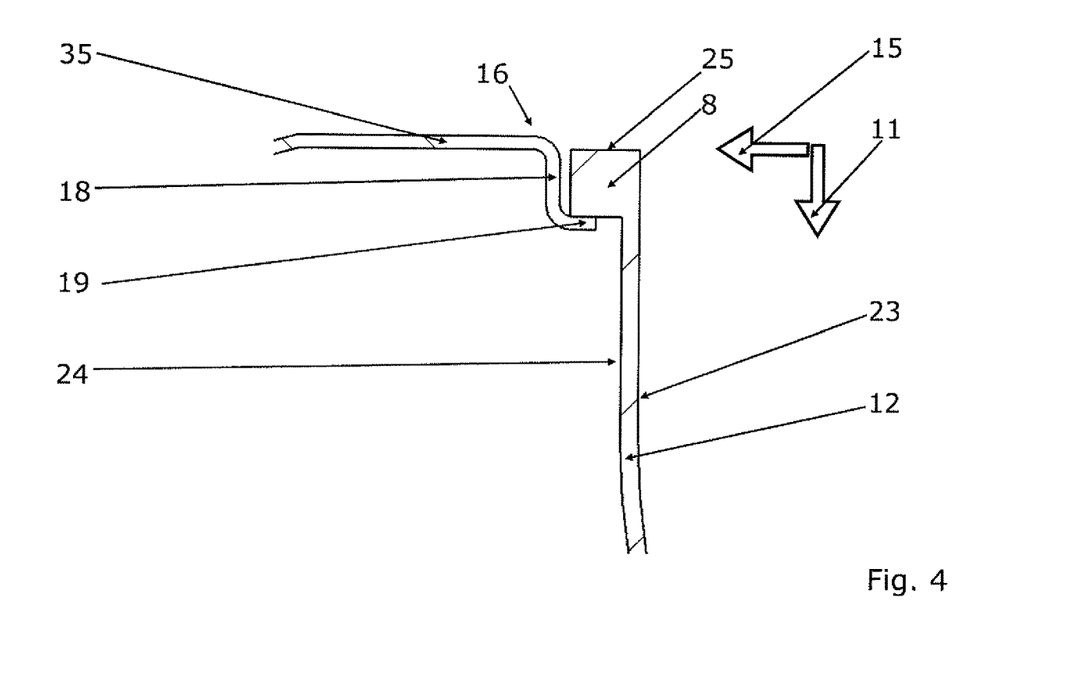
FIG. 4 shows a second sectional view of the filter arrangement according to the invention.

FIG. 3 shows a first sectional view of the filter arrangement 1 of FIG. 1, wherein a sectional view through a holding element 17 and a part of the inserted filter element 2 is shown. FIG. 4 shows a first sectional view of the filter arrangement 1 of FIG. 1, wherein a sectional view through a locking element 16 and a part of the inserted filter element 2 is shown.

As shown in FIG. 3, each holding element 17 has a support section 21 and a spring section 22, wherein the support section 21 substantially extends along a radial axis 15 towards a center 20 of the circular flow-through opening 4, wherein the support section 21 is followed by the spring section 22, wherein the spring section 22 substantially extends along the axial axis 11.

The support section 21 has a first end and a second end. The first end of the support section 21 is connected to the gasket main body 35. The second end is a free end which is spaced apart from the gasket main body 35. The second end is followed by the spring section 22.

The spring section 22 may be elastically deformed while the counter locking collar 8 is inserted into the hollow cylindrical installation space 7 of the locking collar 5. Due to this, the spring section 22 is pushed radially inside in respect to the radial axis 6. As soon as the counter locking collar 8 is in a final installation position, which is shown in FIG. 1 and FIG. 3 and FIG. 4, the spring section 22 pushes against the filter element 2 trying to move back in its initial position in which the elastic deformation vanishes.

The support section 21 forms a section which prevents the filter element 2 being pushed through the flow-through opening 4 of the gasket element 3. Additionally, the spring section 22 provide a force, in particular a restoring force and/or a spring force, which pushes the filter element 2, in particular the counter locking collar 8, against the locking elements 16 in order to avoid a loose fit between the filter element 2 and the gasket element 3. The spring section 22 may provide a force, in particular a restoring force and/or a spring force, along the radial axis 15, in particular a radially outward acting force with respect to the radial axis 15.

As shown in FIG. 4, each locking element 16 has a lever section 18 and a hook section 19, wherein the lever section 18 substantially extends along the axial axis 11, wherein the lever section 18 is followed by the hook section 19, wherein the hook section 19 substantially extends along the radial axis 6 towards the center 20 of the circular flow-through opening 4. The center 20 of the circular flow-through opening 4 is indicated in FIG. 1 and FIG. 2 by a dashed circle.

The lever section 18 has a first end and a second end. The first end of the lever section 18 is connected to the gasket main body 35. The second end is a free end which is spaced apart from the gasket main body 35. The second end is followed by the hook section 19.

The lever section 18 may be elastically deformed while the counter locking collar 8 is inserted into the hollow cylindrical installation space 7 of the locking collar 5. Due to this, the hook section 19 and the lever section 18 may be pushed radially outside in respect to the radial axis 6. As soon as the counter locking collar 8 is in a final installation position, the lever section 18 may snap back in its initial position in which an elastic deformation vanishes. The initial position of lever section 18 with inserted counter locking collar 8 provides a form-fit connection between the counter locking collar 8, the lever section 18 and the hook section 19. The hook section 19 prevents the counter locking collar 8 from being detached along the axial axis 11. The hook section 19 prevents the counter locking collar 8 from being detached along the axial axis 11 in a form-fitting manner.

Thus, the locking elements 16 may form clip elements which prevent the filter element 2 and the gasket element 3 from being detached and/or loosened from each other.

The filter element 2 has an inner surface 23 and an outer surface 24, wherein the inner surface 23 and the outer surface 24 are connected by a forehead surface 25 of the open axial side 9 of the counter locking collar 8. The locking section 13 at least partially contacts at least a section of the outer surface 24, wherein the holding section 14 at least partially contacts at least a section of the inner surface 23, wherein the holding section 14 at least partially contacts at least a section of the forehead surface 25.

The inner surface 23 of the filter element 2 is the surface of the filter element 2 which faces the flow-through opening 4 of the gasket element 3 with respect to the axial axis 11. The outer surface 24 of the filter element 2 is the surface of the filter element 2 which faces away the flow-through opening 4 of the gasket element 3 with respect to the axial axis 11.

The hooks sections 19 at least partially contact at least a section of the outer surface 24, wherein the spring sections 22 at least partially contact at least a section of the inner surface 23, wherein the support sections 21 least partially contact at least a section of the forehead surface 25.

The locking collar 5 and the counter locking collar 8 form a form-fit connection and/or snap-fit connection for fixing the filter element 2 with the gasket element 3.

As shown in FIG. 3 and FIG. 4, the counter locking collar 8 has greater material thickness than the filter element body 12. The material thickness may be the wall thickness, in particular the wall thickness considered in cross section of the filter element 2 as shown in FIG. 3 and/or FIG. 4.

FIG. 5 shows an exhaust system 36 for an internal combustion engine. The exhaust system 36 comprises a first fluid guiding component 26 with a first fluid path 27 and a first flange 28. The exhaust system 36 comprises a second fluid guiding component 29 with a second fluid path 30 and a second flange 31. Moreover, the exhaust system 36 comprises a filter arrangement 1 according to the invention, wherein the filter arrangement 1, in particular the gasket element 3, is arranged and/or clamped between the first flange 28 and the second flange 31 providing a connection of the first fluid path 27 and the second fluid path 30 in a fluid tight manner against an external environment 32 of the fluid guiding components 26, 29.

The first fluid guiding component 26, in particular the first flange 28, forms a ring-shaped installation space 38 and/or a ring groove 38 for the counter locking collar of the filter element. At least a part of the filter element 2, in particular the counter locking collar 8 of the filter element 2, is inserted circumferentially, in particular continuous continuously inserted, in the ring-shaped installation space 38 and/or a ring groove 38.

The first fluid guiding component 26 comprises an inner surface 39 and/or tube inside wall 39. The spring sections 22 of the filter arrangement 1, in particular a contact sections 40 of the spring sections 22 which contacts an inner surface 23 of the filter element 2, provide a force which pushes the filter element 2 radially outwards in respect to the radial axis 15. The spring sections 22, in particular the contact sections 40 of the spring section 22, push the outer surface 24 of the filter element 2 against the inner surface 39 of the first fluid guiding component 26 if the filter arrangement 1 is installed in exhaust system 36. In such a case the spring section 22, in particular the contact section 40 of the spring section 22, provide a gap-free contact between a part of the outer surface 24 of the filter element 2 and a part of the inner surface 39 of the first fluid guiding component 26, such that pollutant particles cannot pass between the part of the inner surface 39 of the first fluid guiding component 26 and the part of the outer surface 24 of the filter element 2. Several spring sections 22, in particular the contact sections 40 of the spring sections 22, may provide a continuously gap-free contact of a part of the outer surface 24 of the filter element 2 and a part of the inner surface 39 of the first fluid guiding component 26 in the circumferential direction 6.

The invention claimed is:

1. A filter arrangement comprising:
   a filter element and a gasket element;
   the gasket element including a substantially circular flow-through opening and a locking collar;
   the locking collar arranged along a circumference of the flow-through opening;
   the locking collar including a hollow cylindrical locking section and a hollow cylindrical holding section that are radially spaced apart from each other so as to define a hollow cylindrical installation space;
   the filter element including a filter element body and a substantially hollow cylindrical counter-locking collar;
   wherein the counter-locking collar includes an open axial side and a covered axial side which are axially spaced apart from each other;
   wherein the covered axial side is covered by said filter element body; and
   wherein the counter-locking collar is at least partially inserted into the hollow cylindrical installation space of the locking collar.

2. The filter arrangement according to claim 1, wherein the locking collar and the counter-locking collar form at least one of a form-fit connection and a snap-fit connection so as to fix the filter element to the gasket element.

3. The filter arrangement according to claim 1, wherein:
   the hollow cylindrical locking section includes a plurality of locking elements circumferentially spaced from each other; and
   the hollow cylindrical holding section includes a plurality of holding elements circumferentially spaced from each other.

4. The filter arrangement according to claim 3, wherein at least one of:
   the plurality of locking elements are substantially spaced equidistantly from each other; and
   the plurality of holding elements are substantially spaced equidistantly from each other.

5. The filter arrangement according to claim 3, wherein at least one of:
- each locking element is respectively arranged between two adjacent holding elements of the plurality of holding elements; and
- a quantity of locking elements of the plurality of locking elements equals a quantity of holding elements of the plurality of holding elements.

6. The filter arrangement according to claim 4, wherein: each locking element includes an axially extending lever section followed by a radially inward extending hook section.

7. The filter arrangement according to claim 6 wherein: each holding element includes a radially inward extending support section followed by an axially extending spring section.

8. The filter arrangement according to claim 7, wherein at least one of:
- the lever sections of the plurality of locking elements are radially spaced apart from the spring sections of the plurality of holding elements; and
- the spring sections have a t-shaped contour.

9. The filter arrangement according to claim 1, wherein a material thickness of the counter-locking collar is greater than a material thickness of the filter element body.

10. The filter arrangement according to claim 1 wherein:
- the filter element further includes an inner surface and an outer surface connected to each other via a forehead surface at the open axial side of the counter-locking collar;
- the hollow cylindrical locking section contacts at least a section of the outer surface;
- the hollow cylindrical holding section contacts at least a section of the inner surface and at least a section of the forehead surface.

11. The filter arrangement according to claim 1, wherein at least one of:
- the filter element is a particulate filter;
- the filter element is formed from a metallic mesh;
- the gasket element is formed from a metallic material; and
- the gasket element is a one-piece punched and bent part.

12. An exhaust system for an internal combustion engine, the exhaust system comprising:
- the filter arrangement according to claim 1;
- a first fluid guiding component including a first fluid path and a first flange; and
- a second fluid guiding component including a second fluid path and a second flange; and
- wherein the filter arrangement is arranged and/or clamped between the first flange and the second flange so as to provide a fluid tight connection between the first fluid path and the second fluid path.

13. The exhaust system according to claim 12, wherein: the hollow cylindrical locking section includes a plurality of locking elements circumferentially spaced from each other, and the hollow cylindrical holding section includes a plurality of holding elements circumferentially spaced from each other.

14. The exhaust system according to claim 13, wherein at least one of:
- each locking element is equidistantly spaced from adjacent locking elements of the plurality of locking elements; and
- each holding element is equidistantly spaced from adjacent holding elements of the plurality of holding elements.

15. The exhaust system according to claim 13, wherein: each locking element is respectively arranged between two adjacent holding elements of the plurality of holding elements; and
a quantity of locking elements of the plurality of locking elements is equal to a quantity of holding elements of the plurality of holding elements.

16. The exhaust system according to claim 13, wherein: each locking element includes an axially extending lever section followed by a radially inward extending hook section.

17. A gasket element for a filter arrangement, the gasket element comprising:
- a substantially circular flow-through opening and a locking collar;
- the locking collar arranged along a circumference of the circular flow-through opening;
- the locking collar including a hollow cylindrical locking section and a hollow cylindrical holding section that are radially spaced apart from each other so as to define a hollow cylindrical installation space; and
- wherein the hollow cylindrical installation space is configured to receive a counter-locking collar of a filter element of the filter arrangement.

* * * * *